Dec. 6, 1955  J. F. SHERWOOD  2,726,062
FISHING REEL
Filed Nov. 2, 1953  2 Sheets-Sheet 1
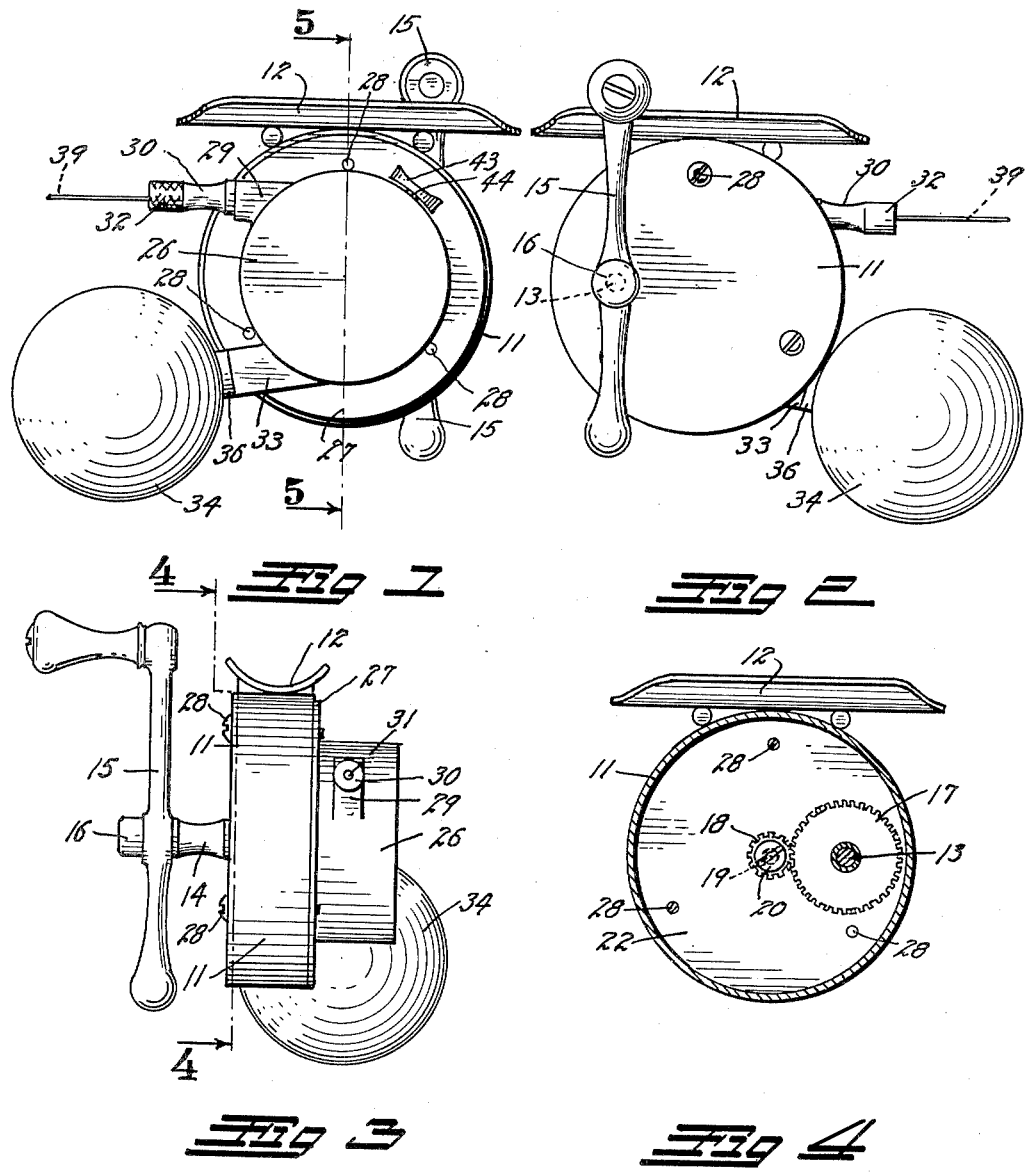
INVENTOR.
JOHN F. SHERWOOD
BY
ATTORNEY

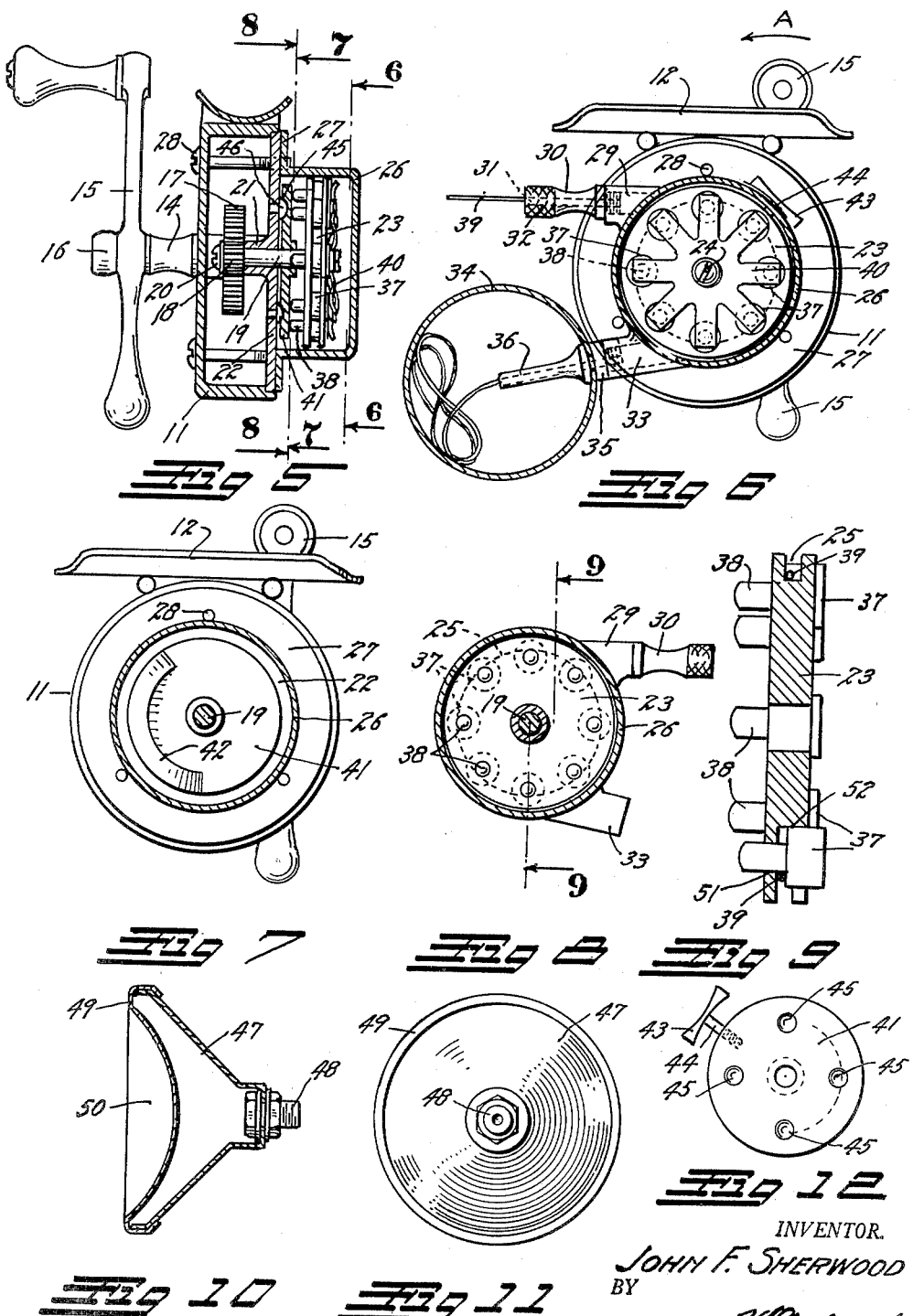

United States Patent Office 2,726,062
Patented Dec. 6, 1955

2,726,062

FISHING REEL

John F. Sherwood, Westminster, Colo.

Application November 2, 1953, Serial No. 389,551

11 Claims. (Cl. 254—175.5)

This invention relates to a fishing reel, and more particularly to the type of reel known as a spinning reel, and has for its principal object the provision of a reel for application to fishing rods which will entirely eliminate the line spool usually employed in such reels.

In the usual spinning reel, the line is wound in a tight circle about a spool, either by rotating the spool or by rotating a winding device about a stationary spool. Such reels place a complete twist in the line for each complete wrapping of the line. The torque exerted by the twists in the line either rotates the line on the spool, causing kinks therein, or rotates the line traveling to the spool so that when the line is cast from the reel, kinks will be formed in the cast line.

Another object of the present invention is to provide means which will grip the line as it enters the reel to retain any twists formed by reeling, so that they will be neutralized during the unreeling to entirely prevent rotation and twisting of the unreeled line as a cast is made.

A further object of the invention is to provide a fishing reel which, when the line is being reeled, will coil the stored line in "figure eight" turns, so that the twist imparted when the line is reeling around one extremity of the figure eight, will be neutralized by the twist imparted when rotating in the opposite direction around the other extremity of the figure eight, whereby no twists will be imparted to the line during reeling, casting, or storing.

A still further object is to so construct the reel that no mechanical movements of the reel mechanism will be required during the casting so that nothing will interfere with the free out-flow of the line.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a left side view of the improved fishing reel;

Fig. 2 is a right side view thereof;

Fig. 3 is a front view thereof;

Fig. 4 is a vertical cross-section, taken on the line 4—4, Fig. 3;

Fig. 5 is a vertical cross-section, taken on the line 5—5, Fig. 1;

Figs. 6, 7, and 8 are similar sections, taken on the lines 6—6, 7—7, and 8—8, Fig. 5;

Fig. 9 is an enlarged, detail section through a line-gripping disc employed in the improved reel, the section being taken on the line 9—9, Fig. 8;

Fig. 10 is a cross-sectional view of an alternate form of line storage container which may be employed with the improved reel;

Fig. 11 is a rear face view of the alternate form of container of Fig. 10; and

Fig. 12 is a detail face view of a cam plate employed in the improved reel.

Basically, the improved reel provides means for gripping a fishing line and retrieving the line along a fishing rod thence forcing the retrieved line into any suitable container in which the line may freely coil in coils of any desired type or direction of wind without resisting the flow of the incoming line.

One embodiment of the improved reel is illustrated in the drawings, and consists of a cup-shaped gear housing 11 preferably, but not necessarily, circular in shape and provided with the usual rod saddle 12 for attachment to the reel seat of any conventional fishing rod.

A crank shaft 13 projects from the housing 11 through a suitable outboard bearing sleeve 14 terminating on the exterior of the housing in a counter-balanced hand crank 15. The crank 15 may be secured on the outer extremity of the crank shaft 13 in any desired manner, such as by means of a suitable retaining nut 16. A toothed drive gear 17 is keyed onto, or otherwise affixed to the inner extremity of the crank shaft 13. The drive gear 17 is constantly in mesh with a relatively smaller toothed pinion 18.

The toothed pinion is fixedly mounted on the outer extremity of a winding shaft 19 by means of a retaining screw 20, or in any other desired manner. The winding shaft 19 is journalled in a fixed bearing sleeve 21 formed on a face plate 22 which is secured over the open face of the gear housing 11 by means of suitable clamp screws 28.

A line-winding disc 23 is fixedly mounted on the inner extremity of the winding shaft 19 in any suitable manner, such as by means of a second retaining screw 24. The winding disc 23 is contained within a cupped cap 26 provided with a peripheral flange 27 which is clamped against the face plate 22 by means of the clamp screws 28.

A line guide boss 29 is formed on the cap 26 adjacent the upper portion thereof and extends tangentially therefrom substantially parallel to the rod saddle 12. A line guide nipple 30 is threaded into the extremity of the boss 29 in axial alignment with the latter. The line guide nipple is provided with an axial line channel 31 for receiving and guiding a fishing line into and out of the cap 26. The line guide nipple 30 is preferably knurled, as shown at 32, to facilitate screwing and unscrewing it from the boss 29, and is preferably formed from hardened material to resist the frictional abrasive action of the fishing line. A second tangentially positioned line guide boss 33 is formed on the cap 26 below the first boss 29. The boss 33 is internally threaded to receive any suitable line reservoir or container provided with a line guide nipple adapted to be threaded into the boss 33.

As illustrated in Figs. 1–9, the line container comprises a hollow spherical container 34 provided with a line guide nipple 35. The nipple 35 terminates interiorly of the container 34 in a hollow spindle 36 extending to the center of the container 34.

The line-winding disc 23 is provided with a peripheral line-receiving groove 25 in which the fishing line, indicated at 39, rests intermediate the bosses 29 and 33. The disc 23 is drilled parallel to its axis with a concentric series of uniformly spaced plug guide holes 51. The outer circumference of each guide hole 51 is tangent to the bottom of the peripheral groove 25 of the disc 23.

The line, while lying in the groove 25, is gripped beneath the edges of a plurality of line-gripping plugs 37, each of which is formed with a concentric guide stud 38. The studs 38 of the plugs extend into the guide holes 51 and the plugs 37 are positioned in the plug sockets 52 so that the edges of the plugs will normally rest against the far side wall of the groove 25 and will act to grip the line thereagainst.

The guide holes and the plug sockets are so positioned relative to the groove 25 that the plurality of studs will align with and form a part of the bottom of the groove. Therefore, when the line 39 lies in the bottom of the groove, it will also lie on and against the studs 38 therein.

It can now be seen that if the plugs 37 are forced into the winding disc 23, the line will be gripped between the bottoms of the plugs and the opposite side of the groove 25, as shown in Fig. 9. The plugs are constantly urged into the disc and against this far side of the groove 25 by means of a resilient spider spring 40, which is clamped in place against the extremity of the winding shaft 19 by means of the second retaining screw 24.

The spider spring 40 is provided with a plurality of resilient spring arms corresponding in number to the number of plugs in the winding disc. Each spring arm is positioned against one of the plugs so that all of the plugs will be independently urged into the winding disc.

The plugs can be released from the line by forcing their studs 38 into the disc against the action of the spring arms on the spider spring 40. This releasing is accomplished by means of a rotatable cam plate 41 which surrounds the winding shaft 19 between the studs 38 and the face plate 22. The cam plate 41 is provided with a raised arcuate surface cam 42 positioned between the bosses 29 and 33 so that the studs 38, during their travel about the axis of the winding shaft 19, will ride upon, and be forced inwardly by, the cam 42 during their travel between the bosses 29 and 33.

Therefore, during the travel of the studs from the boss 29 to the boss 33, they will be free to be urged inwardly by the spring 40 to grip the line, and during their travel between the boss 33 and the boss 29, the studs will be forced into the disc by the cam 42 to cause the plugs to release the line as it exits from the boss 33, and to receive the line as it enters from the boss 29.

Let us assume that the line 39 extends from the line guide nipple 30 around the winding disc 23, through the spindle 36, and into the container 34. Now let us assume that the operator rotates the hand crank 15 in the direction of the arrow "A" of Fig. 6. This causes the gear 17 to rotate the pinion 18 and the winding disc 23 in a clockwise direction in Fig. 6. As each successive plug 37 reaches its uppermost position, its stud 38 will travel from the cam 42, allowing the spring 40 to successively force the plugs against the line to securely grip the latter. The plugs remain in the gripping position until they reach their lowermost position and act to prevent both longitudinal and lateral movement of the line.

As each plug reaches its lowermost position, its stud 38 contacts the cam 42 which acts to force the plug from the line, allowing the latter to freely travel through the boss 33, the nipple 35, and the spindle 36 into the container 34. The incoming line automatically forms itself into a compact figure eight coil within the line container, and continues to coil until the entire length of the line has been received, or until the container is completely filled.

In order to make a cast with the line, it is necessary, of course, to release the grip of the plugs 37 on the line. This is accomplished by the movement of a release button 43, which is positioned on the outside of the cap 26 and which is mounted upon the extremity of a button shank 44 secured to the edge of the cam plate 41. The button shank 44 extends through an opening in the cap which is circumferentially elongated to allow a predetermined circumferential movement of the button. The inner face of the cam plate 41 is provided with a plurality of spaced, round-bottomed sockets 45 which normally rest on hemispherical protuberances 46 projecting outwardly from the face plate 22.

It can be seen that when the cam plate 41 is rotated by the button 43, the sockets 45 will move from the protuberances 46 so that the latter will act to force the entire cam plate uniformly outward against all of the studs 38 to simultaneously release all of the plugs from the line so that the latter can be freely withdrawn from the line guide nipple 30 without resistance. When the desired length of line has been withdrawn, the button 43 is simply moved sufficiently to allow the sockets 45 to again move into alignment with the protuberances 46 to allow the cam plate 41 to return to its former position so that the plugs will again move into gripping engagement with the line.

It is desired to call attention to the fact that the line will coil in one direction in the line container 34 until the internal torque in the line reverses the direction wind to form a second coil in the opposite direction. The torque or twist developed in the line container cannot be communicated to the line beyond the line guide nipple 30, since the plugs prevent lateral rotation of the line. Therefore, the line will spin from the reel and retrieve into the reel without causing any twists or kinks in the line.

An alternate form of line container is illustrated in Fig. 10 comprising a conical, open-ended container 47 provided with a threaded axially-positioned nipple 48 which can be threaded into the second boss 33. The container 47 is closed by means of a removable cap 49 provided with a medial depression 50 extending inwardly within the container 47.

The line from the reel enters the container through the nipple 48 and is forced by the inclined sides of the depression 50 in the cap 49 toward the periphery of the container 47, where it coils in a tight coil for a number of turns in one direction, thence automatically reverses itself and coils for a compensating number of turns in the opposite direction until the entire interior of the container 47 has been completely filled.

While the invention has been more particularly described as pertaining to the coiling and uncoiling of a fishing line, it could be adapted for coiling and uncoiling any desired elongated flexible element such as wire, rope, hose, etc.

In the usual spool-type reel, the reeling diamter constantly varies due to the varying diameter of the coil. Therefore, the number of crank turns required and the torque on the crank constantly changes. This interferes with accurate control of the line. In this improved reel, the reeling diameter is constant regardless of the amount of line on the reel so that accurate control is had at all times.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A device for coiling and uncoiling an elongated flexible element comprising: a rotatable winding disc; a peripheral element-receiving groove formed in the circumferential edge of said disc; a concentric series of spaced-apart gripping plugs inset in one face of said disc, the outer edges of said plugs extending through one side of said groove and being positioned to contact the opposite side thereof; a guide stud extending from each plug through the other face of said disc; means for urging said plugs toward said opposite side so as to grip the flexible element thereagainst; and means positioned to engage said studs to force said plugs from said element.

2. A device for coiling and uncoiling an elongated flexible element comprising: a rotatable winding disc; a peripheral element-receiving groove formed in the circumferential edge of said disc; a concentric series of spaced-apart gripping plugs inset in one face of said disc, the outer edges of said plugs extending through one side of said groove and being positioned to contact the opposite side thereof; a guide stud extending from each plug through said disc and projecting from the latter through the face opposite to said plugs; resilient means acting against said plugs and urging the latter against said element; and a cam positioned to be contacted by said studs for urging the latter inwardly against the action of said spring means during a portion of the arc of travel of said plugs.

3. A device for coiling and uncoiling an elongated flexible member as described in claim 2 in which the cam is mounted upon a cam disc concentric of the axis of said winding disc and positioned parallel to the latter; and means for urging said cam disc toward said winding disc to cause the former to contact and force all of the studs into the latter.

4. A device for coiling and uncoiling an elongated flexible member as described in claim 3 in which the means for urging said cam disc comprises: a second cam means positioned to act against said cam disc so that rotation of the latter will act to force it toward said winding disc; and means for imparting a rotation to said cam disc.

5. A device for coiling and uncoiling an elongated flexible member as described in claim 4 having a first guide means for guiding said flexible element into said groove; and a second guide means for guiding said element from said groove.

6. A device for coiling and uncoiling an elongated flexible member as described in claim 5 having a hollow element-receiving container mounted on and in communication with said second guide means for receiving the flexible element therefrom.

7. A fishing reel comprising: a winding shaft; means for rotating said winding shaft; a winding disc mounted on said winding shaft, said disc having an indented, peripheral groove in its circumferential edge for receiving a fishing line; a cap enclosing said winding disc; a first line-guiding element carried by said cap and having a line channel adapted to guide a fishing line into said groove; a second line guide member carried by said cap and positioned to guide a line from said groove; line-gripping means carried by said line-winding disc adapted to grip the line in said groove as the line travels from the first line guide means to the second line guide means; and a hollow line-receiving container mounted on and supported by and in communication with said second line guide means so as to receive and contain the line discharging from the latter.

8. A fishing reel as described in claim 7 in which the cam means comprises: a cam disc surrounding said winding shaft adjacent the face of said disc opposite said plugs; a face cam formed on said cam disc; and a stud extending from each plug through said opposite face and positioned to contact said face cam during a portion of the rotation of said winding disc.

9. A fishing reel as described in claim 8 having means for bodily moving said cam disc toward said winding disc so as to simultaneously contact all of said studs to simultaneously release all of said plugs from said line.

10. A fishing reel comprising: a winding shaft; means for rotating said winding shaft; a winding disc mounted on said winding shaft, said disc having an indented, peripheral groove in its circumferential edge for receiving a fishing line; a cap enclosing said winding disc; a first line-guiding element carried by said cap and having a line channel adapted to guide a fishing line into said groove; a second line guide member carried by said cap and positioned to guide a line from said groove; line-gripping means carried by said line-winding disc adapted to grip the line in said groove as the line travels from the first line guide means to the second line guide means; a hollow line-receiving container mounted on and supported by and in communication with said second line guide means so as to receive and contain the line discharging from the latter; a plurality of gripping plugs inset in one face of said winding disc, the outer edges of said plugs overlapping the line-receiving groove so as to grip a line therein; spring means urging said plugs against said line; cam means urging said plugs from said line during a portion of the rotation of said winding disc comprising a cam disc surrounding said winding shaft adjacent the face of said disc opposite said plugs and a face cam formed on said cam disc; and a stud extending from each plug through said opposite face and positioned to contact said face cam during a portion of the rotation of said winding disc.

11. A fishing reel as described in claim 10 having means for bodily moving said cam disc toward said winding disc so as to simultaneously contact all of said studs to simultaneously release all of said plugs from said line.

References Cited in the file of this patent

UNITED STATES PATENTS

| | | |
|---|---|---|
| 540,158 | Fouts | May 28, 1895 |
| 752,997 | Ong | Feb. 23, 1904 |
| 789,060 | Pickering | May 2, 1905 |
| 832,069 | Lindquist | Oct. 2, 1906 |
| 2,552,808 | O'Brien | May 15, 1951 |